United States Patent
Zijderhand

[19]
[11] Patent Number: 5,598,167
[45] Date of Patent: Jan. 28, 1997

[54] METHOD AND APPARATUS FOR DIFFERENTIAL LOCATION OF A VEHICLE UNDER CONTROL OF AN INTERNAL CHANGE OF STATUS

[75] Inventor: Frans Zijderhand, Valkenswaard, Netherlands

[73] Assignee: U.S. Philips Corporation, New York, N.Y.

[21] Appl. No.: 433,669

[22] Filed: May 4, 1995

[30] Foreign Application Priority Data

May 6, 1994 [EP] European Pat. Off. ............ 94201259

[51] Int. Cl.$^6$ .................................................. G01S 3/02
[52] U.S. Cl. ............................................ 342/457; 364/449
[58] Field of Search .................................. 342/357, 457, 342/450; 364/449

[56] References Cited

U.S. PATENT DOCUMENTS

| | | | |
|---|---|---|---|
| 4,943,925 | 6/1990 | Moroto et al. | 364/449 |
| 4,970,652 | 11/1990 | Nagashima | 364/449 |
| 5,223,844 | 6/1993 | Mansell et al. | 342/357 |
| 5,353,023 | 10/1994 | Mitsugi | 340/985 |
| 5,374,933 | 12/1994 | Kao | 342/357 |
| 5,450,343 | 9/1995 | Yurimoto | 364/449 |

FOREIGN PATENT DOCUMENTS

| | | |
|---|---|---|
| 0567992 | 11/1993 | European Pat. Off. . |
| 4220963 | 1/1993 | Germany . |
| 9427265 | 11/1994 | WIPO . |

*Primary Examiner*—Thomas H. Tarcza
*Assistant Examiner*—Dao L. Phan
*Attorney, Agent, or Firm*—Arthur G. Schaier

[57] ABSTRACT

For locating an earthbound and freely movable vehicle, first interfacing to an external coordinate system for determining an actual vehicle position is effected. This position is recurrently and wireless transmitted to a remote station. For restricting the number of transmissions in the vehicle a discrete internal change of status is detected. Upon detection the transmitting is effected.

5 Claims, 2 Drawing Sheets

5,598,167

METHOD AND APPARATUS FOR DIFFERENTIAL LOCATION OF A VEHICLE UNDER CONTROL OF AN INTERNAL CHANGE OF STATUS

BACKGROUND OF THE INVENTION

Field of the Invention

The invention relates to a method for locating an earthbound and freely movable vehicle, said method comprising the steps of:

in said vehicle interfacing to an external coordinate system for determining an actual position of the vehicle, and via wireless means transmitting said position on a recurrent basis to a remote station.

The most common example of such vehicle is a motor car in its various embodiments. The invention does not relate to robotic vehicles, to aeroplanes or to rail vehicles, for which often the motion of a single vehicle determines which direct control measures must be taken by the central station to influence the movement of the object. Moreover, these vehicles are not freely movable, but must necessarily follow specified paths in space and time. Robots must perform tasks that are specified minituously. Aeroplanes usually follow continual directions from flight control. Rail vehicles are bound to rails and follow tight schedules. In contradistinction, in the environment of the present invention the central or remote station is not able to follow the vehicle by means of direct sighting through camera, radar or the like, and in principle, the vehicle is independent. The present invention relates to an environment where either the central station is active in tracking-only of the positions, or where it executes only global measures. In this way, the actual position as communicated to the central station can be used for various purposes. Examples are planning of the overall moving of a fleet of service vehicles such as taxis, or the assigning of particular road facilities to appropriate traffic streams. In case the vehicle would deviate from a planned route, the central station could assign a warning or control a change of facilities for receiving the vehicle.

Various methods have been published for determining the actual position of the vehicle. A first method operates with beacons that transmit an actual site code to the vehicle when passing. A second method operates with the so-called GPS or Global Positioning System that through reception of satellite-transmitted wave patterns is able to calculate an actual vehicle position. A third method determines the position exclusively thru in-vehicle sensors, such as odometer and compass. A fourth method determines the position through so-called dead reckoning in comparison to a known road pattern that is retrieved from a mass memory within the vehicle or otherwise. Various combinations of the above methods have attained better accuracy or robustness against interferences or against measuring errors.

One method for transmitting the actual vehicle position to the central station is with a fixed recurrence period. When the number of vehicles is small, this is particularly advantageous, because the central station can actually predict when the next message will arrive, and through some policy for time slot assignment make the best of its limited reception facilities. However, when the number of vehicles grows, and also when their assignment becomes dynamic to various central stations that are organized on a cellular basis, the present inventor has concluded that the number of such transmissions should be advantageously kept low by suppressing the transmitting when effectively no relevant information can be gathered. A further aspect is cost, when some governing authority would tax either the operator of either the vehicle or of the central station for each transmission: when fixed, the transmission recurrency is kept relatively high to cater for the most exacting situation.

SUMMARY OF THE INVENTION

Accordingly, amongst other things it is an object of the present invention to keep the number of transmissions by the vehicles low by transmitting only information pertaining to relevant positions. Now, according to a first aspect, the invention effectively diminishes the number of transmissions in that it is characterized by in said vehicle detecting a discrete internal change of status, and under control of said detecting selectively effecting said transmitting. The change of status may be any of a set of relevant parameters, that may be determined according to need. If no change is happening such as when the vehicle is parked, no position is transmitted. If necessary, the old position then is retrieved in the central station from some appropriate storage mechanism. The invention also relates to a device for practising the method and to an earthbound and freely movable vehicle comprising such a device. Various advantageous further aspects are recited in dependent Claims.

The discrete internal change of status of the vehicle can be one of various categories. It may pertain to the length of road driven, to a deviation from an expectation with respect to temporal or spatial parameters of the route, or to a change in the actual physical situation of the vehicle itself. These will be discussed more in detail hereinafter.

BRIEF DESCRIPTION OF THE DRAWINGS

These and other aspects and advantages of the invention will be described hereinafter with reference to the disclosure of preferred embodiments, and in particular in and by the appended drawings that respectively show.

DETAILED DESCRIPTION OF THE PREFERRED EMBODIMENTS

Figure 1:
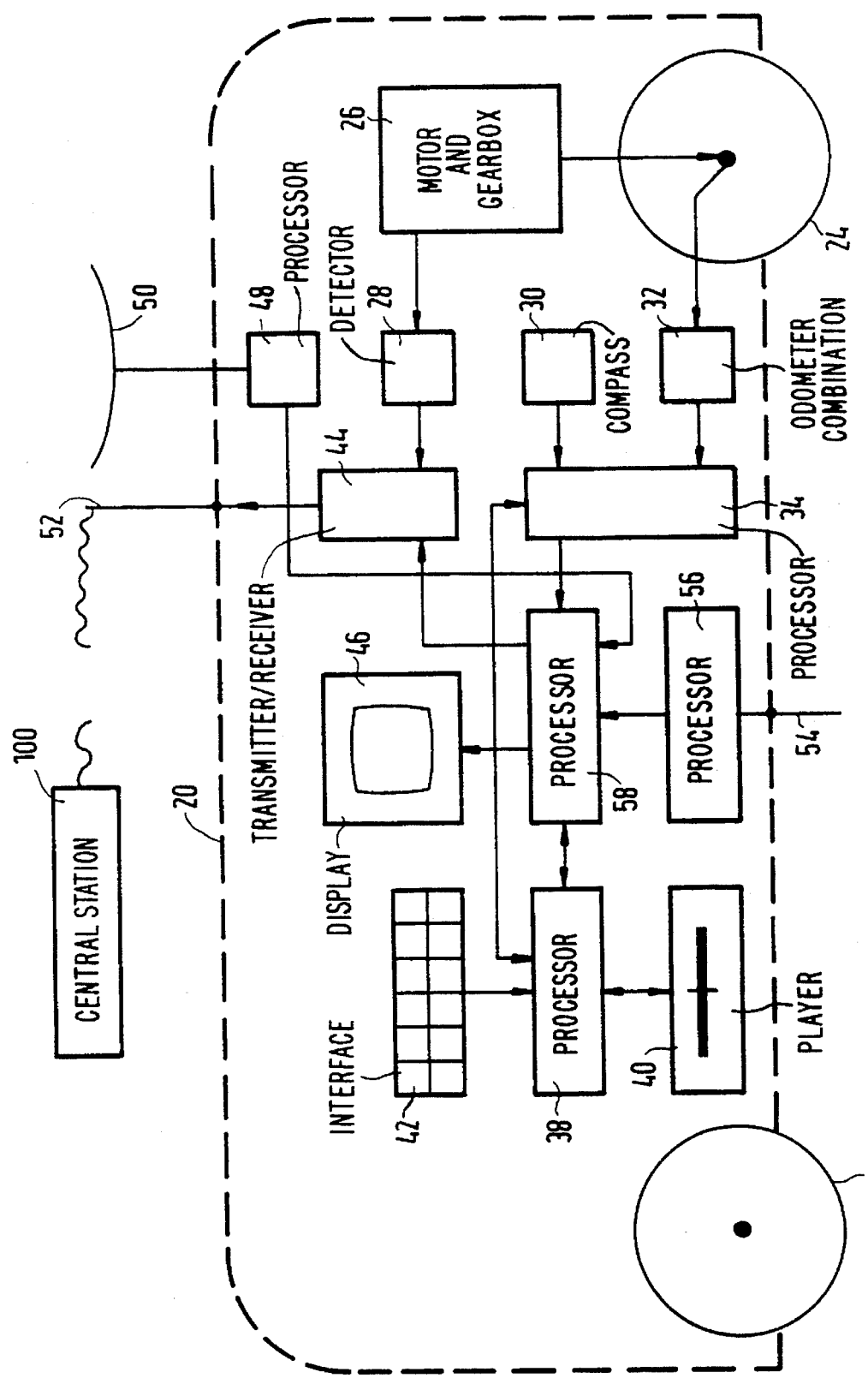
FIG. 1 an overall diagram of a device according to the invention.

FIG. 1 shows an overall diagram of a device according to the invention as located within a more or less standard motor car, that has been shown in a very schematic way only. The car has a body 20, front wheels 22, and rear wheels 24 that are driven by a combination of motor and gearbox 26. For simplicity, the user interface to the motor and other mechanical controllables of the car have not been shown. The car as shown has various systems for determining its actual position. First, there is a compass 30. Second, there is an odometer combination 32, that may have a separate odometer on each one of a wheel pair. In the Figure, this has been shown for the rear, driven wheels, but in practice, usually the nondriven wheels are chosen. The average displacement signalled by the two odometers in combination with the compass reading gives the distance and direction travelled. The difference between the two odometer readings is used to calculate turns, which in combination with the compass may produce corrections and/or calibrations to the distance travelled. These and other calculations are effected in processor 34. By itself the necessary mathematical calculations may be conventional.

A second position determining system has disk antenna 50 that receives wave patterns from various GPS satellites, from which wave patterns in processor 48 an actual position is calculated. A third position determining system has antenna 54 that receives location codes from roadside beacons that have a limited transmission range. Through recognition of the codes, in processor 56 the actual position is ascertained.

Block 40 is a CD-ROM player that contains a random accessible optical disk with geographical data. This data can be accessed by routeplanner processor 38 under selective control from user interface 42 that contains a number of actuatable keys. Inputting of a starting position and of a destination activates access of appropriate map data from player 40. Therefrom processor 38 calculates an optimum route, an expected time of arrival, and possibly various intermediate instants on which the vehicle is expected to pass along relevant points of the route. Processor 58 combines the position data produced by processors 34 (sensor deter-mined), 48 (GPS determined) and 56 (through beacon signals), as far as appropriate, accesses the geographical data from player 40 that are relevant to the preliminary actual position as calculated and maps these on the actual map. A dead-reckoning operation maps the calculated preliminary position on the most probable actual road position, when off-road motion may be ignored. Actual position and planned route in the neighbourhood of the actual position can be displayed on display element 46 in map form. Other data relevant to the driver may be displayed as well, such as actual time, expected time of arrival, instantaneous guidance indications such as arrows, and destination.

In practice, not all three position data generation mechanisms will be present. The beacon system is by itself sufficient, as long as the beacon infrastructure has been realized for example by means of beacons on all major roads at half kilometre beacon-to-beacon distances. The GPS system may by itself be sufficient if obstacles such as high-rise buildings are sufficiently rare and the GPS accuracy is good. In practice, the CD-ROM support is however necessary, for avoiding drift arising from inaccurate sensors or bridging temporary failure of the other methods. As an alternative, the map data may be supplied by a broadcast mechanism. The routeplanning may be foregone in certain realizations of the present invention. The routeplanning may be executed in some central station.

Block 28 can detect a discrete internal change of status of the vehicle. Examples are beginning or terminating the ignition, starting or stopping of the vehicle, change of cargo conditions such as full, empty, dangerous load, temperature change of load if critical, or occurrence of a persisting alarm condition, such as caused by a burglar, stealing of the complete car, or by an accident. Other internal changes of status of the vehicle as pertaining to the navigation can be detected in the central processor 58. This processor is connected to the transmitter-receiver 44, to the routeplanning processor 38, and also to the position determining processors 34 and 56. Examples of such other changes are: a predetermined distance has been covered, the vehicle deviates by more than a threshold amount from a route that has been planned by the local vehicle system or by the central station, the expected time of arrival or any of the intermediate passage instants has changed by more than a threshold amount, or the vehicle travels along a road element with a traversal time that is sufficiently different from expected, such as through traffic stoppage.

Block 44 is a transmitter-receiver for a cellular broadcast system which has a limited range that is suited for the cell size that may amount to a few kilometres. Element 52 is the associated antenna that may be shared with other systems, such as radio or telephone. Detection of an internal change of status detected by either element 28 or central processor 58 incite the central processor to cause transmission of the actual position by transmitter-receiver 44. The actual position is then formatted and via antenna 52 broadcast to the central station 100. As far as necessary, the message may contain other relevant information, such as the nature of the discrete internal change of status of the vehicle. Other mechanisms for the latter transmission are feasible as well, such as transmission by satellite or via the roadside beacon infrastructure.

Figure 2:
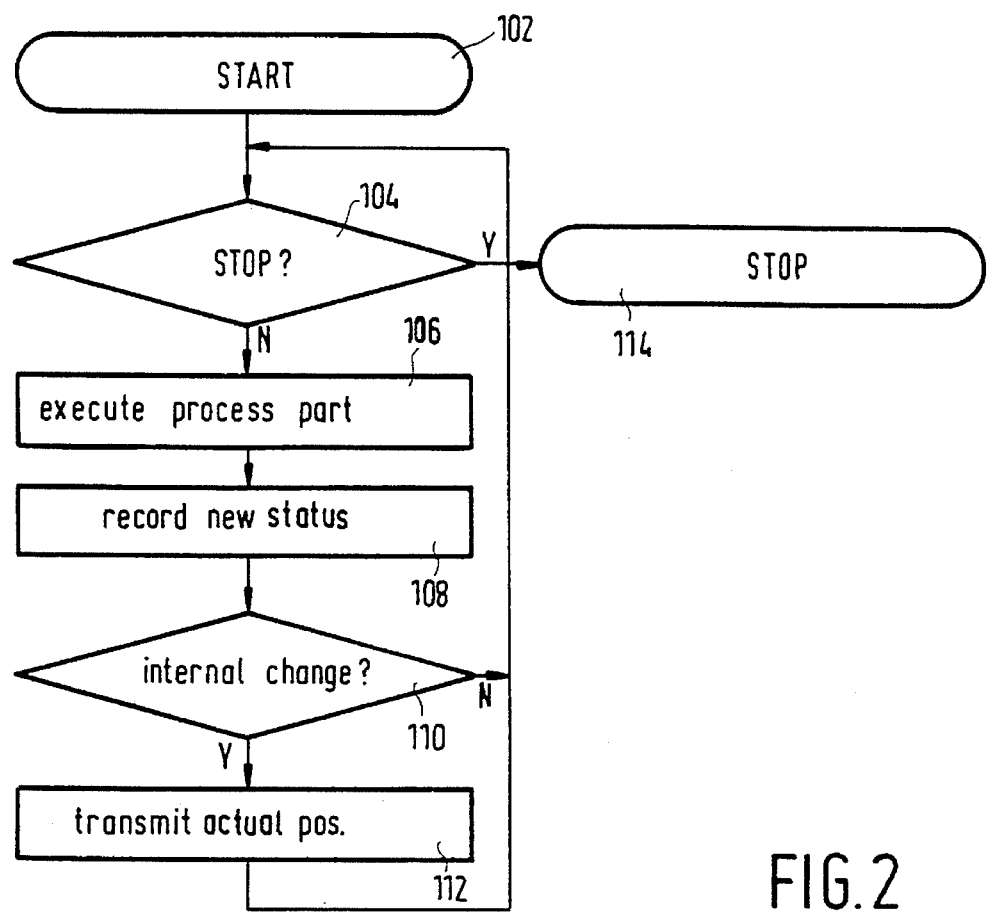
FIG. 2 a flow diagram of the inventive method.

FIG. 2 shows a flow diagram of the inventive method. Block 102 is the start block of the system. Herein, the processors as far as relevant are activated. In fact, in the setup of FIG. 1, detector 28 and central processor 58 may remain standby, whereas the other processors under nonoperative conditions are switched off. This means for example, that a persistent alarm condition may cause the most recent actual position of the vehicle to be broadcast, even in such cases where the vehicle is towed away, so that this position does no longer correspond to the actual physical position of the vehicle. Generally, the activation in block 102 may be through the insertion of the ignition key. In block 104 occurrence of a stop condition is detected, in particular the removal of the ignition key, and more in particular, the persistence of this situation for a predetermined time such as 10 minutes. If positive, in block 114 the system is put to rest. If negative, in block 106 a predetermined amount of processing is executed, which may entail the calculation of at least one actual position of the vehicle, the measuring of a certain amount of time, and various other jobs or procedures, as the case may be. In block 108 the new status as defined in the system is recorded. In block 110 it is detected whether the new status has changed with respect to the previous status. If negative, the system reverts to block 104. If positive, in block 112 the actual position of the vehicle is transmitted. One refinement is the following: if the new status is only gradually different from the previous status, the previous one may be kept for further comparison. Only upon transmission of the actual vehicle position, the old status is overwritten.

Figure 3:
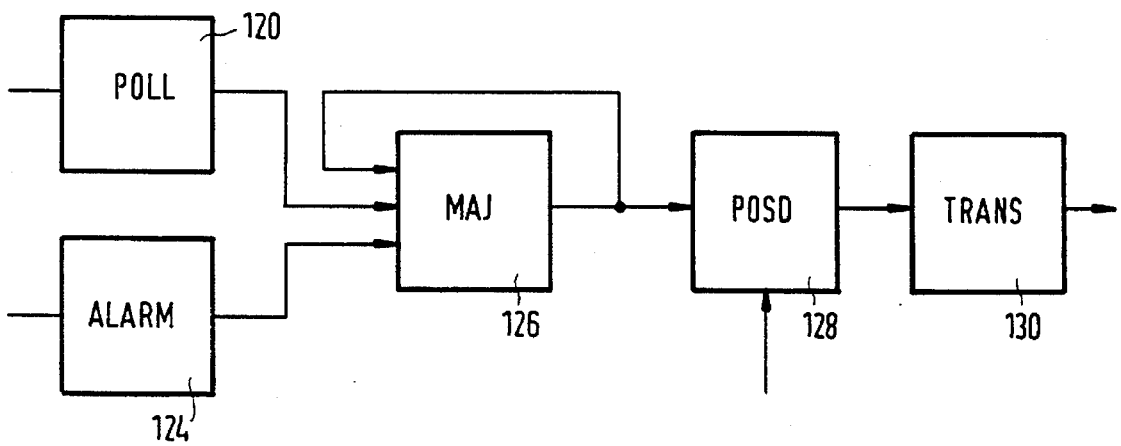
FIG. 3 the generation of a persisting transmission in case of alarm.

FIG. 3 shows the generation of a persisting transmission of the actual position in case of alarm. Block 124 is the alarm condition proper, which may be fire or the like, but in particular, stealing of the car. The detection can be made through infrared detection of a moving person which detection is not overruled thru the correct entering of a personal identification code. The same could be effected by detecting opening of a vehicle door, or any other appropriate mechanism. Now, the owner or operator of the vehicle may possess a particular, unique calling code for the vehicle in question. Upon presentation of this particular code to the remote or central station, the station may send a polling message to the vehicle, and the vehicle system in polling receiver 120 may recognize the signal. Block 126 implements a holding mechanism. As shown, in this case a majority logic is present that effects a two-out-of-three majority decision on its three inputs as shown. Upon reception of the polling request, the output of block 126 becomes high, thereby rendering the uppermost input of the block high. As long as the alarm condition persists, also the output of block 126 remains high. This signal activates the position detection subsystem 128 that interfaces to an external coordinate system, that may be the one represented by the satellites, by the beacon infrastructure, or by the sensor-accessed system of world coordinates. This interfacing is symbolized by the lower arrow entering block 128. The activation of block 128 by the arrow entering from the left causes it to present the actual position of the vehicle to transmission block 130; the latter's outgoing arrow at the fight symbolizes the transmission.

Hereinafter, a list is given of exemplary discrete internal changes of state that trigger the transmission of the actual vehicle position, and the advantages of the associated policy.

a. Upon operational change of the vehicle. Certain states may require additional attention. For example, removal of the ignition key signals that stoppage may be lengthy, so that the vehicle will no longer require attention, as long as the stoppage goes. Upon unloading of the vehicle it may be scheduled for a new task, depending on its position. Change in the temperature of a refridgerated transport may necessitate rescheduling. A stolen car may be followed by practising the method according to the invention, in particular, after the presentation of a unique code information by the operator to the central station as described supra. A further change of status may be a new driver that takes over. This may again necessitate updating directives. It should be noticed that the terms 'remote station' and 'central station' refer to the embodiments of some overall authority, of which the effective realization can be distributed. The transmission proper as one from the vehicle can be on a per-cell basis, whereas the central authority can be present at a single locality, that in turn is connected to the relay stations.

b. Exceeding a threshold item as differentiating from a preceding transmitting position. This can mean that slow vehicles will transmit less often. For example, during a complete traffic jam, the actual motion is irrelevant, and attention may be concentrated on other vehicles. From a different point of view, it is not the time that governs vehicle control measures, but rather the distance travelled because the environment is space-limited rather than time-limited, through the often barely sufficient capacity of the road network. As explained already, transmission can be relatively expensive, and in particular not very cost effective for vehicles that are standing still.

c. Exceeding a threshold item as a deviation from a planned or expected route, in terms of place or time. A deviation from such route may influence overall policies to be followed, for example, because the driver has noticed a problem situation that the road network manager was not yet aware of. Another consequence may again be the need for rescheduling the vehicle in question, of other vehicles slated for rendezvous, or it may cause the central station to send a warning or directive to the vehicle in question. Even if the route was not overall machine-planned, the deviation may mean deviation from an extrapolated route that was based on recent history of the vehicle: for example, this means that the central station will know all turns taken by the vehicle, and through map matching may execute the position finding discussed earlier.

Another deviation could be simply determined as a deviation from a straight line. A minimum deviation can on the other hand be often allowed, such as changing lanes on a multi-lane highway if one of the lanes is blocked for some reason, or by taking a limited-size excursion from the shortest route, all this either decided by the system organization, or to the discretion of a human operator. Another situation occurs when the planned route has been broadcasted to the vehicle that itself has no routeplanner facility. In that case the detected deviation warns the central station that the planned route for the vehicle in question may need updating.

What is claimed:

1. A method for locating an earthbound and freely movable vehicle, said method comprising the steps of: interfacing a vehicle to an external coordinate system for determining an actual position of the vehicle, transmitting said actual position to a remote station, determining whether said vehicle has travelled a predetermined distance from said position and based on said determination, selectively transmitting a new actual position to said remote station.

2. A method for locating an earthbound and freely movable vehicle, said method comprising the steps of:

determining a first actual position of the vehicle;

transmitting the first actual position to a remote station;

determining a new actual position of the vehicle;

comparing the new actual position with the first actual position and based on said comparison, selectively transmitting the new actual position to the remote station.

3. A method for locating an earthbound and freely movable vehicle, said method comprising the steps of:

determining a first actual position of the vehicle;

transmitting the first actual position to a remote station;

determining a new actual position of the vehicle;

comparing the new actual position to a predetermined threshold and based on said comparison, transmitting the new actual position to the remote station.

4. A device for locating an earthbound and freely movable vehicle, said device comprising:

an interfacer for interfacing to an external coordinate system;

a detector for detecting a first actual position of a vehicle and for detecting a change of position of said vehicle from said first actual position to a new actual position;

a comparator for comparing said new actual position with said first actual position; and a transmitter that transmits the first actual position of the vehicle to a remote station and transmits the new actual position to the remote station based on said comparison.

5. An earthbound and freely movable vehicle comprising a device as claimed in claim 4.

* * * * *